US010368087B2

(12) United States Patent
Amer et al.

(10) Patent No.: US 10,368,087 B2
(45) Date of Patent: Jul. 30, 2019

(54) DYNAMIC RELOAD OF VIDEO ENCODER MOTION ESTIMATION SEARCH WINDOW UNDER PERFORMANCE/POWER CONSTRAINTS

(71) Applicants: Advanced Micro Devices, Inc., Sunnyvale, CA (US); ATI Technologies ULC, Markham (CA)

(72) Inventors: Ihab Amer, Markham (CA); Gabor Sines, Markham (CA); Edward Harold, Markham (CA); Jinbo Qiu, Markham (CA); Lei Zhang, Markham (CA); Yang Liu, Markham (CA); Zhen Chen, Shanghai (CN); Ying Luo, Markham (CA); Shu-Hsien Wu, Markham (CA); Zhong Cai, Shanghai (CN)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 191 days.

(21) Appl. No.: 15/271,055

(22) Filed: Sep. 20, 2016

(65) Prior Publication Data

US 2018/0084270 A1    Mar. 22, 2018

(51) Int. Cl.
*H04N 19/513*    (2014.01)
*H04N 19/105*    (2014.01)
(Continued)

(52) U.S. Cl.
CPC ........... *H04N 19/57* (2014.11); *H04N 19/433* (2014.11)

(58) Field of Classification Search
CPC ........ H04N 19/57; H04N 19/56; H04N 19/61; H04N 19/533; H04N 19/176;
(Continued)

(56) References Cited

U.S. PATENT DOCUMENTS

| 2007/0002951 A1* | 1/2007 | Jahanghir | ............... H04N 5/145 375/240.17 |
| 2009/0207915 A1* | 8/2009 | Yan | ........................ H04N 19/53 375/240.16 |

(Continued)

*Primary Examiner* — Zaihan Jiang
*Assistant Examiner* — Samuel D Fereja
(74) *Attorney, Agent, or Firm* — Volpe and Koenig, P.C.

(57) ABSTRACT

A processing apparatus is provided that includes an encoder configured to encode current frames of video data using previously encoded reference frames and perform motion searches within a search window about each of a plurality of co-located portions of a reference frame. The processing apparatus also includes a processor configured to determine, prior to performing the motion searches, which locations of the reference frame to reload the search window according to a threshold number of search window reloads using predicted motions of portions of the reference frame corresponding to each of the locations. The processor is also configured to cause the encoder to reload the search window at the determined locations of the reference frame and, for each of the remaining locations of the reference frame, slide the search window in a first direction indicated by the location of the next co-located portion of the reference frame.

20 Claims, 7 Drawing Sheets

(51) Int. Cl.
H04N 19/172 (2014.01)
H04N 19/57 (2014.01)
H04N 19/433 (2014.01)

(58) Field of Classification Search
CPC .. H04N 19/513; H04N 19/573; H04N 19/139; H04N 19/51; H04N 19/53; H04N 5/145; H04N 19/147; H04N 19/43; H04N 19/52; H04N 19/523; H04N 19/433; H04N 19/567; H04N 19/577; H04N 19/105; H04N 19/137; H04N 19/172; H04N 19/42; H04N 19/527; H04N 19/00684; H04N 19/103; H04N 19/119; H04N 19/132; H04N 19/156; H04N 19/19; H04N 19/557; H04N 19/107; H04N 19/174; H04N 19/40; H04N 19/44; H04N 19/521; H04N 19/597; H04N 5/144; H04N 19/102; H04N 19/109; H04N 19/11; H04N 19/117; H04N 19/142; H04N 19/154; H04N 19/187; H04N 19/30; H04N 19/33; H04N 19/37; H04N 19/436; H04N 19/58; H04N 19/00; H04N 19/00678; H04N 19/114; H04N 19/122; H04N 19/129; H04N 19/152; H04N 19/17; H04N 19/192; H04N 19/46; H04N 19/587

See application file for complete search history.

(56) References Cited

U.S. PATENT DOCUMENTS

2010/0208820 A1* 8/2010 Huang ............... H04N 19/56
　　　　　　　　　　　　　　　　　　　375/240.16
2016/0286232 A1* 9/2016 Li ..................... H04N 19/513

* cited by examiner

DYNAMIC RELOAD OF VIDEO ENCODER MOTION ESTIMATION SEARCH WINDOW UNDER PERFORMANCE/POWER CONSTRAINTS

BACKGROUND

Conventional video compression methods include motion-compensated prediction for reducing amounts of video data to encode by exploiting temporal correlations between successive frames of a video stream. Motion-compensated prediction includes determining, for each portion (e.g., block of pixels) of a current video frame being encoded, a similar block in a reference frame (e.g., a previously encoded frame, group of frames, or portion of a frame) to be used as a predictor to encode the portion of the current video frame being encoded. For each block of a current frame to be encoded, a search of a previously encoded portion of data is performed within a reference area (i.e., search window) around a co-located block in the reference frame.

The size of the search window and its location relative to the reference frame is determined prior to the searching. Although the likelihood of determining a similar block predictor increases as the size of the search window increases (i.e., because a larger previously encoded portion of the reference frame is used for the prediction), a smaller search window constrained to a portion of a frame is typically used to reduce the size of local memory (e.g., local cache memory) used to store previously encoded data. When data between frames migrates outside the smaller search window (e.g., data corresponding to objects moving quickly between frames), however, the migrated data is not captured by the smaller sliding search window.

BRIEF DESCRIPTION OF THE DRAWINGS

A more detailed understanding can be had from the following description, given by way of example in conjunction with the accompanying drawings wherein.

DETAILED DESCRIPTION

A sliding search window provides more efficient (e.g., less time and power per search) searching by sliding (e.g., a block horizontally for each sequential search) the search window relative to the reference frame such that, for each search, the data corresponding to the new portion (i.e., portion not searched in the previous search) of the search window is retrieved from external memory (i.e., non-local cache memory) while the locally stored data for the previously searched portions of the search window is reused. Data which migrates outside the sliding search window is not searched, however, resulting in less accurate prediction.

Moving the search window to a position (e.g., indicated via a motion map) which more accurately predicts the migrating data (instead of sliding the search window to the next sliding position) typically includes reloading the search window. When a search window is reloaded, the data for each portion of the reloaded search window is retrieved from non-local memory. While reloading of the search window for each current block to be encoded more accurately predicts data migrating outside the search window, reloading incurs more time and consumes more power to retrieve, from non-local memory, the data for each portion of the search window.

Processing apparatuses and methods of motion compensated prediction are described herein which dynamically determine locations to reload a motion estimation search window according to a threshold number of search window reloads for a portion of the frames. As used herein, a portion of a frame (e.g., reference frame or current frame) includes any number of pixels, such as for example, a frame, a block (e.g., macroblock) of pixels of a frame, a row of pixels of a frame, a column of pixels of a frame, or any adjacent number of pixels of a frame. The threshold number of search window reloads is determined for a portion of a frame or a plurality of frames (e.g., plurality of reference frames or plurality of current frames).

A motion map indicating predicted motions at different locations of the reference frame is analyzed prior to searching the blocks of the reference frame for block predictors to determine which locations of the reference frame to reload the search window according to the threshold number of search window reloads. A threshold number of search window reloads is determined for a portion of a frame or a plurality of frames to provide a more efficient search process while maintaining accurate prediction of migrating data.

A processing apparatus is provided that includes an encoder configured to encode current frames of a plurality of frames of video data using previously encoded reference frames of the plurality of frames of video data. The encoder is also configured to perform a plurality of motion searches within a motion search window about each of a plurality of co-located portions of a reference frame of the previously encoded reference frames. The processing apparatus also includes a processor configured to determine, prior to performing the plurality of motion searches, which of a plurality of locations of the reference frame to reload the motion search window according to a threshold number of search window reloads using predicted motions of portions of the reference frame corresponding to each of the plurality of locations. The processor is also configured to cause the encoder to reload the motion search window at the determined locations of the reference frame and, for each of the remaining locations of the reference frame, slide the motion search window in a first direction indicated by the location of the next co-located portion of the reference frame.

A method of motion compensated prediction is provided that includes encoding current frames of a plurality of frames of video data using previously encoded reference frames of the plurality of frames of video data. The method also includes determining, prior to performing a plurality of motion searches within a motion search window about each of a plurality of co-located portions of a reference frame of the previously encoded reference frames, which of a plurality of locations of the reference frame to reload the motion search window according to a threshold number of search window reloads using predicted motions of portions of the reference frame corresponding to each of the plurality of location. The method further includes reloading the motion search window at the determined locations of the reference frame and, for each of the remaining locations of the reference frame, sliding the motion search window in a first direction indicated by the location of the next co-located portion of the reference frame.

A tangible, non-transitory computer readable medium is provided that includes instructions for causing a computer to perform a method of motion compensated prediction. The instructions include encoding current frames of a plurality of frames of video data using previously encoded reference frames of the plurality of frames of video data. The instructions also include determining, prior to performing a plurality of motion searches within a motion search window about each of a plurality of co-located portions of a reference frame of the previously encoded reference frames, which of a plurality of locations of the reference frame to reload the motion search window according to a threshold number of search window reloads using predicted motions of portions of the reference frame corresponding to each of the plurality of locations. The instructions further include reloading the motion search window at the determined locations of the reference frame, and for each of the remaining locations of the reference frame, sliding the motion search window in a first direction indicated by the location of the next co-located portion of the reference frame.

Figure 1:
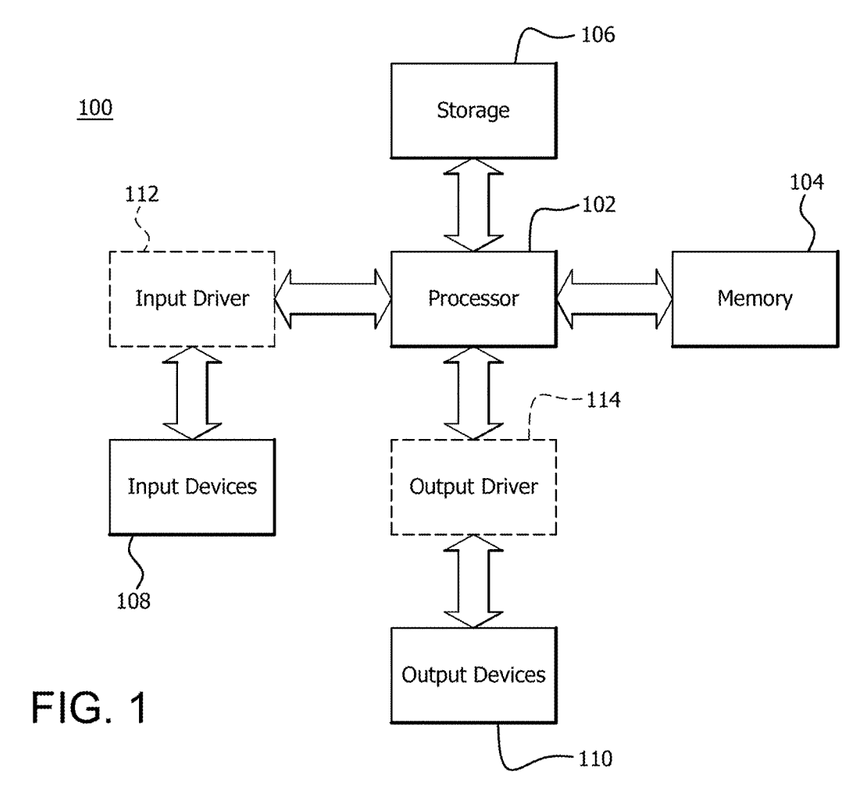
FIG. 1 is a block diagram of an example device in which dynamic reloading of a motion estimation search window is implemented.

FIG. 1 is a block diagram of an exemplary device 100 in which dynamic reloading of a motion estimation search window is implemented. The device 100 can include, for example, a computer, a gaming device, a handheld device, a set-top box, a television, a mobile phone, or a tablet computer. The device 100 includes a processor 102, memory 104, a storage 106, one or more input devices 108, and one or more output devices 110. The device 100 also includes an input driver 112 and an output driver 114. It is understood that the device 100 can include additional components not shown in FIG. 1.

The processor 102 can include a CPU, a GPU, a CPU and GPU located on the same die, or one or more processor cores, wherein each processor core can be a CPU or a GPU. Memory 104 can be located on the same die as the processor 102, or can be located separately from the processor 102. Portions of memory 104 include volatile and non-volatile memory, for example, random access memory (RAM), dynamic RAM, or a cache.

Types of storage 106 include a fixed or removable storage, for example, a hard disk drive, a solid state drive, an optical disk, or a flash drive. Example input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Example output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
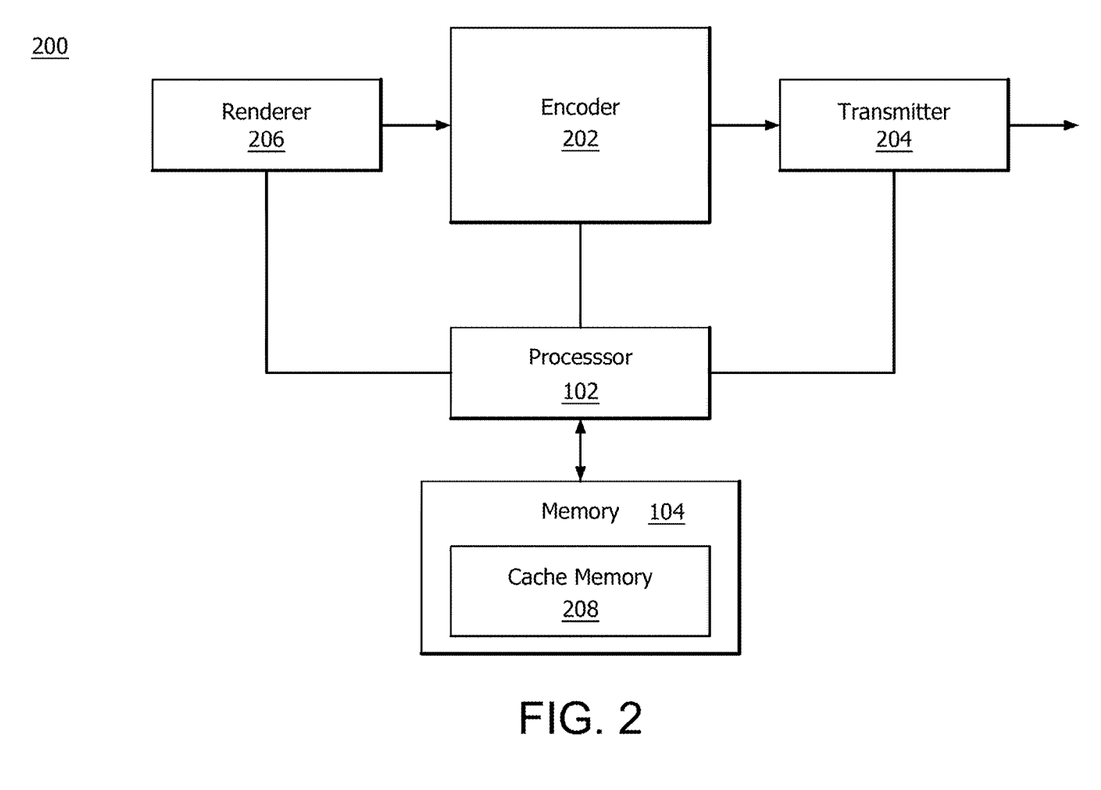
FIG. 2 is a block diagram illustrating exemplary processing apparatus components used to dynamically reload a motion estimation search window.

FIG. 2 is a block diagram illustrating exemplary components of a processing apparatus 200 used to perform dynamic reloading of a motion estimation search window. As shown in FIG. 2, processing apparatus 200 comprises processor 102, encoder 202, transmitter 204, video renderer 206 and memory 104. Each of the components shown in FIG. 2 can be part of the exemplary device 100 shown in FIG. 1.

As shown in FIG. 2, processor 102 is in communication with video encoder 202, transmitter 204, renderer 206 and memory 104, which includes cache memory 208 local to encoder 202. Processor 102 is configured to cause video encoder 202 to perform dynamic reloading of a motion estimation search window during encoding of frames of video data, as described in more detail below.

Video encoder 202 is configured to receive video data from renderer 206, receive instructions from processor 102 to encode the video data by dynamically reloading a motion estimation search window and provide the encoded video data to the transmitter 204. The video encoder 202 can also be configured to provide audio-video (A/V) synchronization of received audio data and the received video data as well as format the video data into packets (e.g., IP packets) for transporting over a network. Encoder is configured to construct motion maps using motion information provided by renderer 206 indicating movement (e.g., amount and direction) of video data. Construction of motion maps include using information determined from a variety of techniques, such as downsampling (e.g., perform pass in lower resolution to determine information about predicted motion vectors of a reference frame) of data in reference frames performed by renderer 206.

Transmitter 204 is configured to transmit video data to be decoded and/or displayed (e.g., as part of a client network interface controller (NIC)) over one or more networks (e.g., local area network), including wired (e.g., Ethernet) or wireless networks (e.g., via WiFi, Bluetooth, and other wireless standards). Alternatively, transmitter is configured to transmit the encoded video data to a decoder on the same processing apparatus 200 (e.g., via a local device bus).

Renderer 206 is configured to render (e.g., render the next frame or portion, such as a slice, block, macro block or field of the next frame) data as images for display by, for example, executing rendering instructions/commands included in applications. Renderer 206 can also include be configured to perform color space conversion, scaling and optics warping (e.g., to correct image distortion). Renderer 206 is also configured to provide motion information to the encoder 202 indicating movement (e.g., amount and direction) of video data to be used by encoder 202 to construct a motion map, as described in more detail below.

Figure 3A:
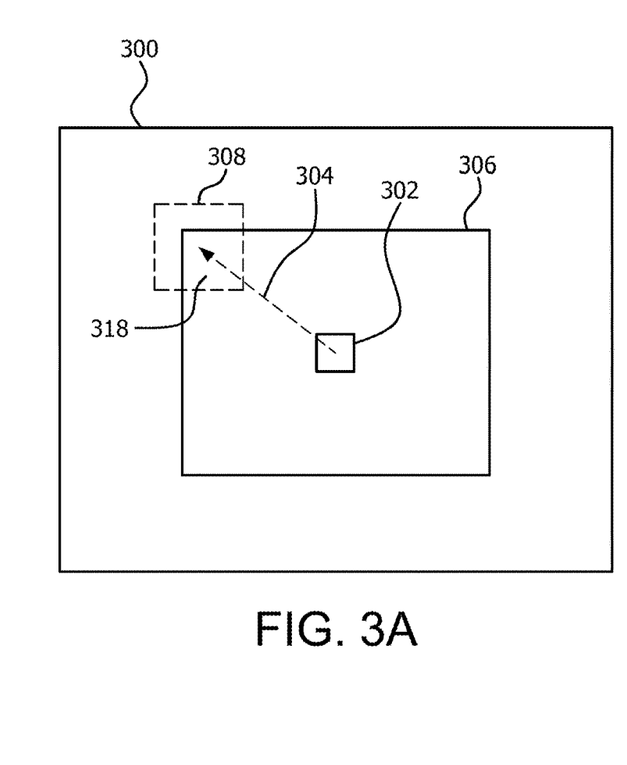
FIG. 3A is an illustration of an exemplary reference frame comprising a co-located block, a search area, a search window and a search range used in motion compensation prediction.
Figure 3B:
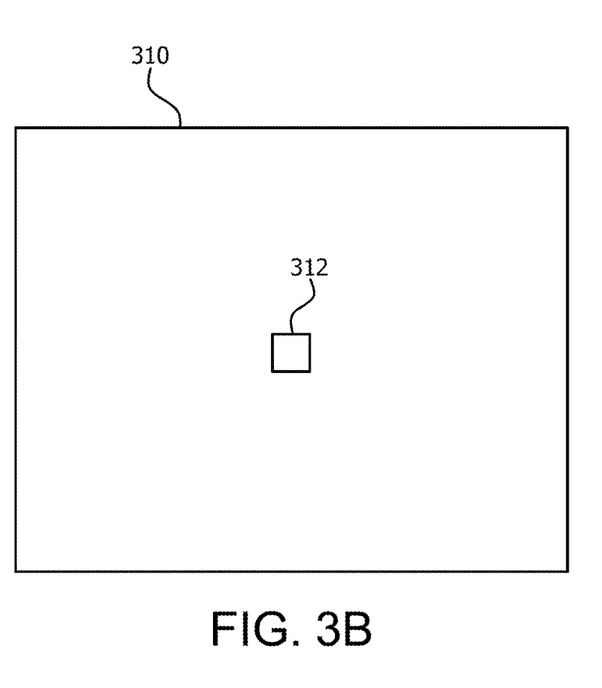
FIG. 3B is an illustration of a current frame comprising a current block to be decoded.

FIG. 3A is an illustration of an exemplary reference frame 300 comprising a co-located block 302, a predicted motion vector 304, a search window 306 and a search range 308 used in motion compensation prediction. FIG. 3B is an illustration of current frame 310 comprising current block 312 to be decoded.

Search windows are used to reduce the size of the search area (e.g., less than searching a frame) for each search and, therefore, reduce the amount of time incurred and power consumed to retrieve the previously encoded data from non-local memory for each search, reduce the size of local memory (i.e., preserve silicon area) used to store the previously encoded data for each search. Video encoding techniques also include selecting search ranges (e.g., around a predicted motion vector) to provide more efficient searches (e.g., performance per watt). For example, search range 308 shown in FIG. 3A lies within the reference frame 300 around predicted motion vector 304 determined from other blocks (e.g., previously encoded neighboring blocks). Data corresponding to each portion of the reference frame 300 searched within the boundaries of the search range 308 is stored in the local encoder memory (e.g., cache memory 208 shown in FIG. 2). Because local encoder memory is limited, the predicted motion vector 304 is caused to remain within a subset (e.g., search window 306) of the reference frame 300 typically centered about the co-located block 302 in the reference frame 300, as shown for example in FIG. 3A.

As shown in FIG. 3A, part of the search range 308 is located outside the search window 306, but because the search is limited to the search window 306, the actual search area 318 is limited to the overlapping region between the search window 306 and the search range 308, as shown in FIG. 3A. Some objects (e.g., objects which move quickly between frames or objects moving between frames having large temporal distances) are likely to migrate between frames to locations outside the search window 306. A smaller sized search window 306 results in less accurate motion-compensation prediction of data corresponding to the migrated objects outside the search window 306. When such objects move outside the search windows, encoding the current block either as an intra-predicted block or as an inter-predicted block with high-energy residuals negatively affects the Rate-Distortion (RD) performances of the encoder.

Figure 4A:
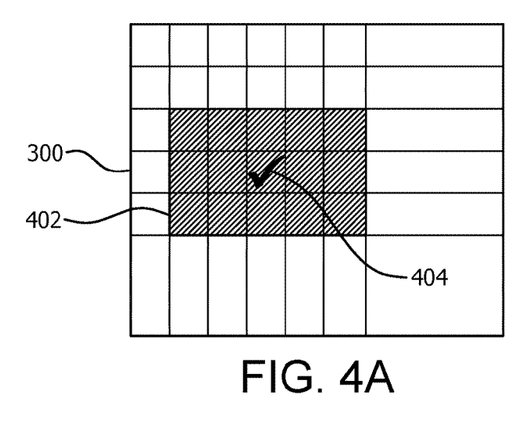
FIGS. 4A through 4D illustrate an exemplary sliding search window used to search around successive co-located blocks of a reference frame.
Figure 4B:
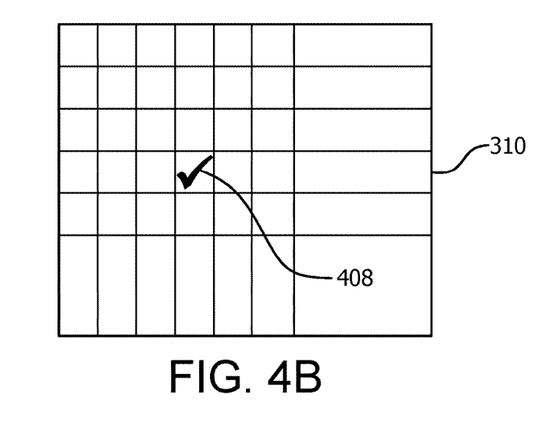
Figure 4C:
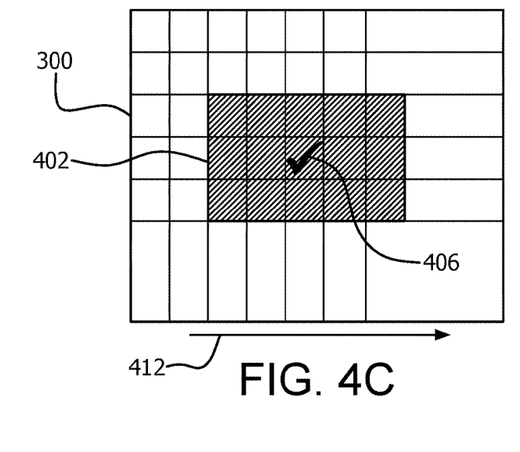
Figure 4D:
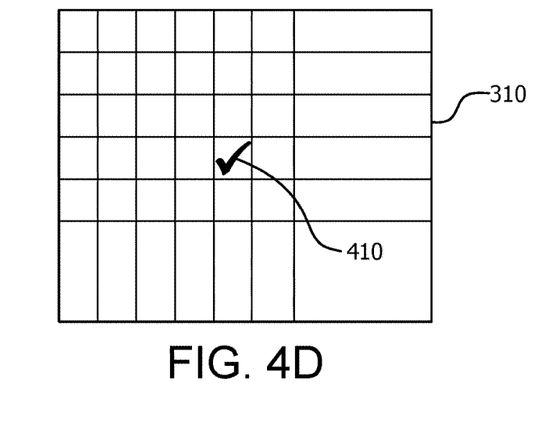

FIGS. 4A through 4D illustrate an exemplary sliding search window 402 used to search around successive co-located blocks 404 and 406 of a reference frame 300. To better illustrate the sliding window technique, co-located blocks 404 and 406 in reference frames 300 and their corresponding blocks 408 and 410 in current frames 310 each include a checkmark. FIG. 4A shows search window 402 around co-located block 404 of reference frame 300 used to encode the corresponding block 408 of current frame 310 shown in FIG. 4B. FIG. 4C shows search window 402 at a position different from its position in FIG. 4A and provided around co-located block 406 of reference frame 300 used to encode the corresponding block 410 of the next current frame 310 shown in FIG. 4D (subsequent to current frame 310 shown in FIG. 4B). As shown in FIGS. 4A and 4C, search window 402 slides in a direction to the right (indicated by arrow 412 in FIG. 4C) from its position in FIG. 4A to its position in FIG. 4C. The position of the search window 402 in FIG. 4A is based on the location of block 404 in FIG. 4A. The position of the search window 402 in FIG. 4C is based on the location of block 406 in FIG. 4C. Accordingly, the direction of movement of the search window 402 is based on the offset in location of co-located block 406 in FIG. 4C from co-located block 404 in FIG. 4A.

When one or more objects move between frames in a direction different than the direction (indicated by arrow 412 in FIG. 4C) between horizontally offset co-located blocks (404 and 406) in successive frames, however, the new position of the search window 402 in FIG. 4C results in less accurate motion-compensation prediction because the data corresponding to the one or more objects that move in the different direction is more likely to migrate outside of the search window 402.

Instead of sliding a search window in a direction based on the offset of the location of block 406 in FIG. 4C from block 404 in FIG. 4A, a search window is moved in a direction based on one or more different parameters indicating a direction of movement different than a direction based on the location of the next co-located block. That is, the search window is reloaded in a direction based on the indicated predicted motions for blocks of the reference frame.

Figure 5A:
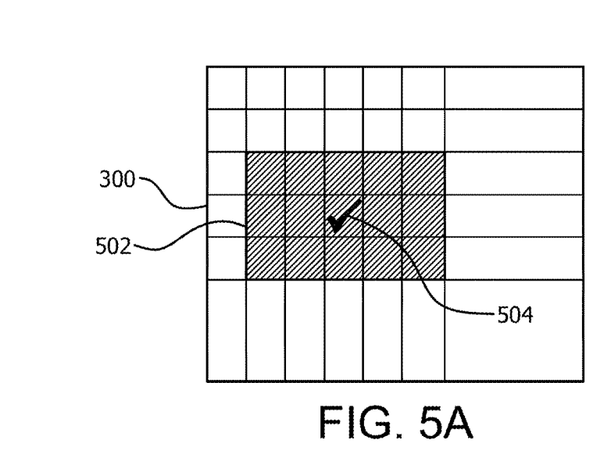
FIGS. 5A through 5D illustrate an exemplary reloaded search window used to search around successive co-located blocks of a reference frame.
Figure 5B:
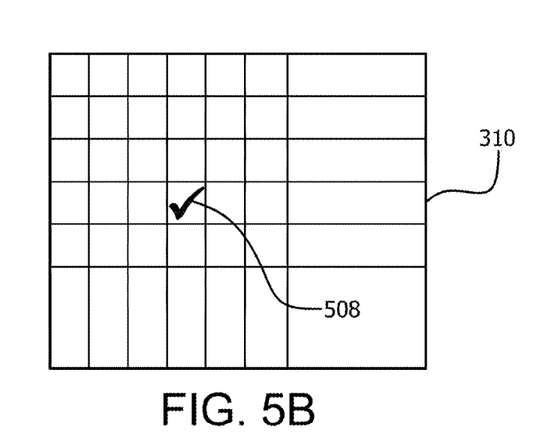
Figure 5C:
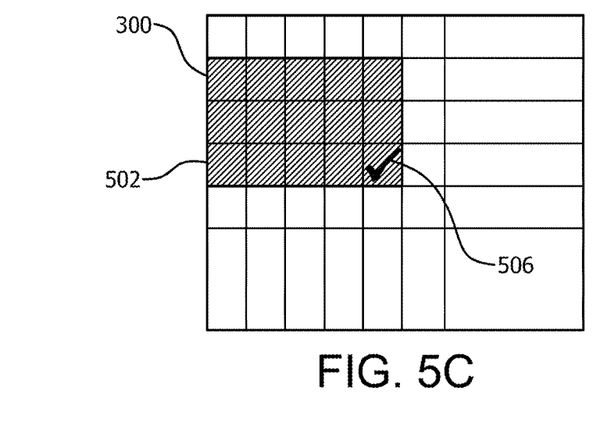
Figure 5D:
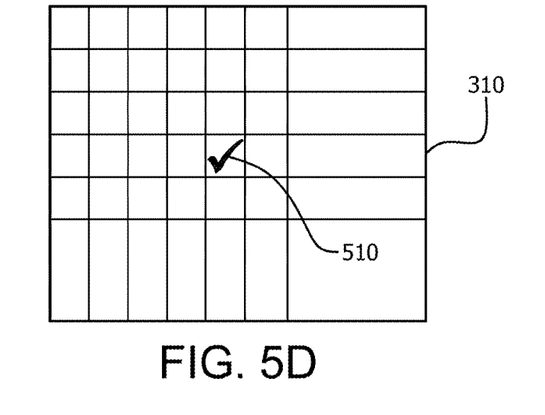

FIGS. 5A through 5D illustrate an exemplary reloaded search window 502 used to search around successive co-located blocks 504 and 506 of a reference frame 300. To better illustrate the sliding window technique, co-located blocks 504 and 506 in reference frames 300 and their corresponding blocks 508 and 510 in current frames 310 each include a checkmark. FIG. 5A shows search window 502 around co-located block 504 of reference frame 300 used to encode the corresponding block 508 of current frame 310 shown in FIG. 5B. FIG. 5C shows search window 502 at a reloaded position different from its position in FIG. 5A (i.e., offset up and to the left from its position in FIG. 5A) and provided around co-located block 506 of reference frame 300 used to encode the corresponding block 510 of the next current frame 310 shown in FIG. 5D (subsequent to current frame 310 shown in FIG. 5B).

Figure 6:
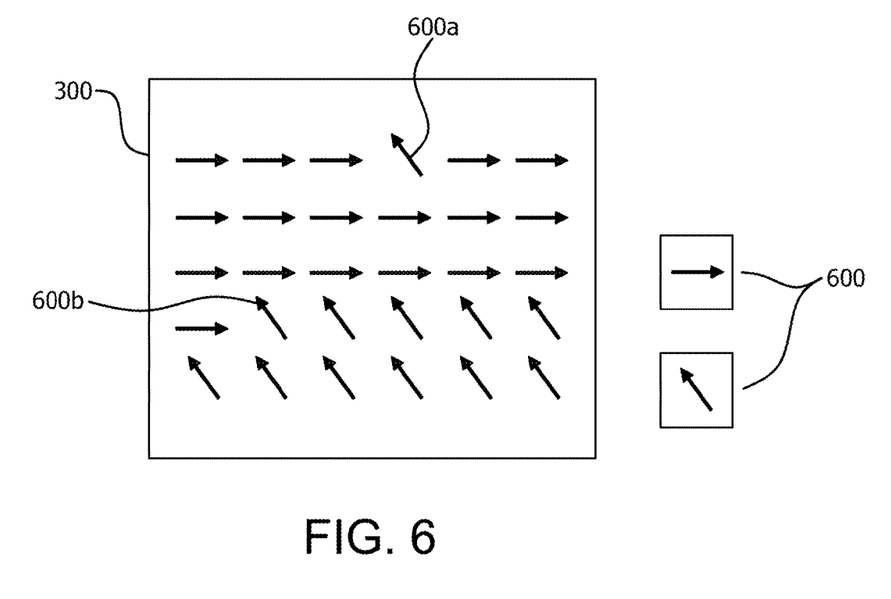
FIG. 6 illustrates a plurality of different prediction motion vectors at different locations of an exemplary reference frame having a plurality of block rows and block columns.

The movement of search window 502 is now described with reference to FIG. 6. FIG. 6 is an illustration of a constructed motion map of a reference frame 300 having a matrix of rows and columns of exemplary prediction motion vectors 600 each corresponding to a portion (e.g., block of pixels) of the reference frame 300. The number of rows and columns shown in FIG. 6 is merely exemplary. The direction and magnitude of the movement of each frame portion is indicated by each corresponding prediction motion vector 600.

As shown in row 1 of the reference frame 300, the first three prediction motion vectors 600 indicate movement of their corresponding frame portions in the same horizontal direction. The prediction motion vector 600a shown at the location corresponding to row 1, column 4 in FIG. 6 indicates movement of its corresponding frame portion in a direction (i.e., up and to the left) different from the horizontal direction of the first three prediction motion vectors 600. The direction of the next two prediction motion vectors 600 of row 1 which follow prediction motion vector 600a is also the same as the direction of the first three prediction motion vectors 600 preceding prediction motion vector 600a, thereby indicating the same horizontal movement of their corresponding frame portions. The direction of each of the prediction motion vectors 600 in rows 2 and 3, as well as the first prediction motion vector 600 in row 4 is also the same as the direction of the first three prediction motion vectors 600 of row 1 of reference frame 300. The direction of prediction motion vector 600b at row 4, column 2 of frame reference 300 indicates movement of its corresponding frame portion in a direction (i.e., up and to the left) different from the preceding prediction motion vectors 600.

Instead of sliding the search window 402 in the direction (indicated by arrow 412 in FIG. 4C) based on the offset of co-located block 406 in FIG. 4C from co-located block 404 in FIG. 4A, a more accurate prediction of the data migrating in the direction (i.e., up and to the left) indicated by the prediction motion vectors 600a and 600b in FIG. 6 (and more likely to migrate outside the search window) is provided by reloading and moving the search window 502 as shown in FIGS. 5A and 5C in the same direction. While reloading of the search window 502 illustrated in FIGS. 5A and 5C more accurately predicts the migrating data, each search at the reloaded position incurs more time and consumes more power than a search at the next sliding window position because more time is incurred and more power is consumed to retrieve the encoded data from non-local memory at the reloaded position than the time incurred and power consumed to reuse data stored in local memory which corresponds to portions searched at the previous search position.

A threshold number of search window reloads is determined for a portion of a frame or a plurality of frames to provide a more efficient search process while maintaining a level of accuracy of predicting migrating data. For example, the threshold number of search window reloads is determined for a portion of a reference frame (e.g., a number of blocks of a frame, a row of a reference frame, a number of rows of a reference frame), a reference frame or a plurality of reference frames.

Based on the threshold number of search window reloads, the constructed motion map is analyzed prior to performing motion searching around each co-located block of the reference frame to determine where to reload the search window. Locations of portions of the reference frame (e.g., coordinates of a reference frame based on a first pixel of a block, a row, a column or other portion) are determined for where to reload the motion search window. The determined reload locations are based on one or more parameters, such as for example, averaging data (e.g., amount and direction of the motion) for a number of neighboring vectors, counting (via a counter not shown) a number of consecutive blocks indicating motion in a same direction or a similar direction (e.g., within directional boundary range), whether the motion represents a region of interest (e.g. surrounded by a field of blocks with the same motion vector), which portions' motions will reside outside the search window obtained by sliding the search window, potential consequences if the motion is missed (e.g. variance information) and other parameters that facilitate improved efficiency of the motion searching.

If one of an allocated number of threshold search window reloads is performed whenever an uncaptured motion vector is encountered at a portion of the reference frame without considering other portions that reside later in the reference frame, the threshold number of reloads can be prematurely exhausted before reaching other portions having motions (e.g., larger portions of motion change) in which reloads at their locations realize a more efficient and/or more accurate searching efficiency.

Processor 102 causes encoder (or a separate analyzer/comparator component) to compare, prior to performing motion searching, motion vectors of the constructed motion map to determine which portion locations to perform reloads. For example, the portions beginning at the location corresponding to prediction motion vector 600b at row 4, column 2 and continuing through row 5 of reference frame 300 in FIG. 6 represent a larger portion of motion change (from the direction indicated by the prediction motion vectors 600 in the horizontal direction) than the single portion corresponding to the prediction motion vector 600a at row 1, column 4 of reference frame 300 in FIG. 6. Accordingly, when processor 102 causes the encoder 202 to compare, prior to performing motion searching, the motion vectors 600 of the constructed motion map at different locations of the reference frame 300 in FIG. 6, it is determined that reloading the search window at the portion corresponding to prediction motion vector 600b at row 4, column 2 of reference frame 300 in FIG. 6 is likely to realize a more efficient and/or more accurate searching efficiency than reloading the search window at the location corresponding to the prediction motion vector 600a at row 1, column 4 of reference frame 300 in FIG. 6. The number of portions corresponding to change in motion directions shown in FIG. 6 is merely exemplary. It is understood that any number of portions and motion vectors can be compared to determine the locations for reloading the motion search window according to a threshold search window reloads.

Figure 7:
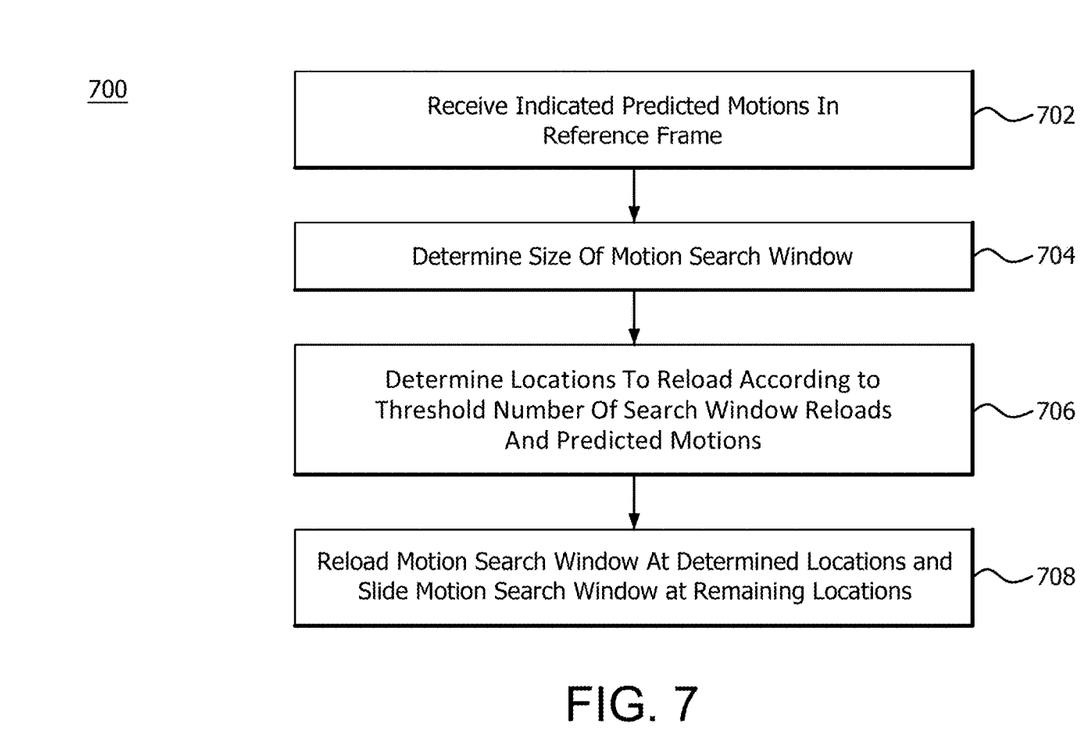
FIG. 7 is a flow diagram illustrating an exemplary method of dynamically reloading a motion estimation search window.

FIG. 7 is a flow diagram 700 illustrating an exemplary method of motion compensated prediction. As shown at block 702 of FIG. 7, the method comprises receiving predicted motions of portions of the reference frame corresponding to locations of the reference frame. An example of predicting the motions include downsampling the data of the current frame and reference frame (e.g., performing a first pass on downsampled versions of the current frames and reference frames) in a lower resolution and the size of the motion search window is dynamically determined using information from the downsampling. Prediction of the motions also includes information (e.g., prediction motion vectors) via a motion map.

As shown at block 704 of FIG. 7, the method comprises determining a size of a motion search window defining a motion search area about each of a plurality of co-located blocks of the reference frame. The size of the motion search window can be dynamically determined (e.g., using information from downsampling) at any point during encoding of the video frames prior to searching a portion of a frame, a frame or a plurality of the frames. The size of the motion search window can also be determined prior to encoding of the video frames and a single motion search window is used to search about each co-located block.

As shown at block 706 of FIG. 7, the method comprises determining which of a plurality of locations of the reference frame to reload the motion search window according to a determined threshold number of search window reloads (e.g., per a portion of a frame, per a frame or per a plurality of frames) using predicted motions of portions of the reference frame corresponding to each of the plurality of locations.

As shown at block 708 of FIG. 7, the method comprises performing a plurality of motion searches within a motion search window about each of a plurality of co-located portions of the reference frame by reloading the motion search window at the determined locations of reference frame and sliding the motion search window in a direction indicated by the location of the next co-located portion for the remaining locations of reference frame.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements motion compensated prediction.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing apparatus comprising:
   an encoder configured to:
      encode current frames of a plurality of frames of video data using previously encoded reference frames of the plurality of frames of video data; and
      perform a plurality of motion searches within a motion search window about each of a plurality of co-located portions of one or more of the previously encoded reference frames; and
   a processor configured to:
      prior to performing each of the plurality of motion searches:
         determine a threshold number of search window reloads for the co-located portions; and
         determine which of a plurality of locations, each corresponding to one of the co-located portions of the one or more reference frames to reload the motion search window according to the determined threshold number of search window reloads and predicted motions at each location of the co-located portions; and
      perform the motion searches by causing the encoder to:
         reload the motion search window at the determined locations of the one or more reference frames; and
         for each of the remaining locations of the one or more reference frames, slide the motion search window in a first direction indicated by the location of the next co-located portion of the one or more reference frames.

2. The processing apparatus of claim 1, wherein the processor is further configured to cause the encoder to reload the search window at the determined locations of the co-located portions by moving the search window in a second direction based on the predicted motions of the co-located portions of the one or more reference frames.

3. The processing apparatus of claim 1, wherein the threshold number of search window reloads is determined for one of: a portion of a reference frame; a reference frame; and a plurality of reference frames.

4. The processing apparatus of claim 1, wherein the processor is further configured to:
   determine a size of the motion search window defining a motion search area about each of the plurality of co-located portions of the reference frame; and
   determine which of the plurality of locations of the co-located portions of the one or more reference frames to reload the motion search window according to the determined size of the motion search window.

5. The processing apparatus of claim 1, further comprising:
   a renderer configured to configured to provide rendered video data and motion information indicating movement of the video data between frames,
   wherein the processor is further configured to cause the encoder to construct a motion map indicating the predicted motions of the co-located portions of the reference frame using information provided by the renderer.

6. The processing apparatus of claim 5, wherein the processor is further configured to:
   cause the renderer to construct a motion map indicating the predicted motions for the portions of the one or more reference frames using information provided by the renderer; and
   provide the constructed motion map to the encoder.

7. The processing apparatus of claim 1, wherein the motions of the co-located portions of a reference frame is predicted by downsampling the data of a current frame and a reference frame in a lower resolution and a size of the motion search window is dynamically determined using information from the downsampling.

8. The processing apparatus of claim 1, wherein the predicted motions for the plurality of co-located portions of the one or more reference frames are represented by prediction motion vectors at each location of the plurality of co-located portions of the one or more reference frames.

9. The processing apparatus of claim 8, wherein the processor is further configured to determine which of the plurality of locations of the reference frame to reload the motion search window based on at least one of:
   averaging the predicted motions for a number of neighboring prediction motion vectors at each location; and
   determining a number of consecutive portions indicating the predicted motions are in a same direction or within a direction boundary range.

10. A method of motion compensated prediction, the method comprising:
   encoding current frames of a plurality of frames of video data using previously encoded reference frames of the plurality of frames of video data;
   determining, prior to performing a plurality of motion searches within a motion search window about each of a plurality of co-located portions of one or more of the previously encoded reference frames, a threshold number of search window reloads for the co-located portions;
   determining, prior to performing the plurality of motion searches, which of a plurality of locations, each corresponding to the co-located portions of the one or more reference frames, to reload the motion search window according to the determined threshold number of search window reloads using and predicted motions at each location for each of the co-located portions;
   perform the motion searches by:
      reloading the motion search window at the determined locations of the co-located portions of the one or more reference frames; and
      for each of the remaining locations of the co-located portions of the reference frame, sliding the motion search window in a first direction indicated by the location of the next co-located portion of the reference frame.

11. The method of claim 10, wherein reloading the motion search window at the determined locations of the one or more reference frames further comprises moving the search window in a second direction based on the predicted motions of the co-located portions of the one or more reference frames.

12. The method of claim 11, wherein determining which of the plurality of locations to reload the motion search window further comprises at least one of:
averaging the predicted motions for a number of neighboring prediction motion vectors at each location; and
determining a number of consecutive co-located portions indicating the predicted motions are in a same direction or within a direction boundary range.

13. The method of claim 10, wherein the threshold number of search window reloads is determined for one of: a portion of a reference frame; a reference frame; and a plurality of reference frames.

14. The method of claim 10, further comprising:
determining a size of the motion search window defining a motion search area about each of the plurality of co-located portions of the one or more reference frames; and
determining which of the plurality of locations of the co-located portions of the one or more reference frames to reload the motion search window according to the determined size of the motion search window.

15. The method of claim 10, further comprising:
receiving rendered video data and motion information indicating movement of the video data between frames,
constructing a motion map indicating the predicted motions of the co-located portions of the one or more reference frames using the motion information provided by the renderer.

16. The method of claim 10, further comprising predicting the predicted motions of the co-located portions of the one or more reference frames by:
downsampling the data of the reference frame and the current frame in a lower resolution; and
dynamically determining a size of the motion search window by using information from the downsampling.

17. The method of claim 10, wherein a size of the motion search window is determined prior to searching around each co-located portion and the motion search window having the determined size is used to search about each co-located portion.

18. The method of claim 10, wherein the motions of the plurality of co-located portions of the one or more reference frames are predicted using prediction motion vectors at each location of the plurality of co-located portions of the one or more reference frames.

19. A tangible, non-transitory computer readable medium comprising instructions for causing a computer to perform a method of motion compensated prediction, the instructions comprising:
encoding current frames of a plurality of frames of video data using previously encoded reference frames of the plurality of frames of video data;
determining, prior to performing a plurality of motion searches within a motion search window about each of a plurality of co-located portions of one or more of the previously encoded reference frames, a threshold number of search window reloads for the co-located portions;
determining, prior to performing the plurality of motion searches, which of a plurality of locations, each corresponding to the co-located portions of the one or more reference frames to reload the motion search window according to the determined threshold number of search window reloads and predicted motions at each location for each of the co-located portions;
performing the motion searches by:
reloading reload the motion search window at the determined locations of the co-located portions of the one or more reference frames; and
for each of the remaining locations of the co-located portions of the reference frame, sliding the motion search window in a first direction indicated by the location of the next co-located portion of the reference frame.

20. The computer readable medium of claim 19, wherein reloading the motion search window at the determined locations of the one or more reference frames further comprises moving the search window in a second direction based on the predicted motions of the co-located portions of the one or more reference frames.

* * * * *